(12) United States Patent
Reiter et al.

(10) Patent No.: US 7,155,524 B1
(45) Date of Patent: Dec. 26, 2006

(54) BACKOFF PROTOCOLS AND METHODS FOR DISTRIBUTED MUTUAL EXCLUSION AND ORDERING

(75) Inventors: Michael Kendrick Reiter, Raritan, NJ (US); Gregory Chockler, Zur Hadassa (IL); Dahlia Malkhi, Jerusalem (IL)

(73) Assignees: Lucent Technologies Inc., Murray Hill, NJ (US); Hebrew University, Jerusalem ( * ) Notice: Subject to any disclaimer, the term of this patent is extended or adjusted under 35 U.S.C. 154(b) by 696 days.

(21) Appl. No.: 10/005,508

(22) Filed: Dec. 4, 2001

Related U.S. Application Data

(60) Provisional application No. 60/251,013, filed on Dec. 4, 2000.

(51) Int. Cl.
G06F 15/16 (2006.01)
G06F 15/173 (2006.01)
G06F 15/167 (2006.01)

(52) U.S. Cl. .................................. 709/229; 709/226

(58) Field of Classification Search ................ 709/223, 709/229, 249, 225, 226; 340/10.1, 10.2, 340/229; 717/101; 710/200; 707/8
See application file for complete search history.

(56) References Cited

U.S. PATENT DOCUMENTS

| | | | | |
|---|---|---|---|---|
| 5,226,159 A | * | 7/1993 | Henson et al. .................. 707/8 |
| 5,293,621 A | * | 3/1994 | White et al. ................. 710/107 |
| 5,625,795 A | * | 4/1997 | Sakakura et al. ............ 711/148 |
| 5,669,002 A | * | 9/1997 | Buch ........................... 710/200 |
| 5,734,909 A | * | 3/1998 | Bennett ........................ 710/200 |
| 5,835,601 A | * | 11/1998 | Shimbo et al. .............. 713/165 |
| 6,026,401 A | * | 2/2000 | Brealey et al. ................. 707/8 |
| 6,177,861 B1 | * | 1/2001 | MacLellan et al. ......... 340/10.1 |
| 6,463,532 B1 | * | 10/2002 | Reuter et al. ................ 709/224 |
| 6,502,136 B1 | * | 12/2002 | Higuchi et al. ............. 709/226 |
| 6,662,252 B1 | * | 12/2003 | Marshall et al. ............ 710/200 |
| 6,704,873 B1 | * | 3/2004 | Underwood ................. 713/201 |
| 6,959,337 B1 | * | 10/2005 | McLaughlin et al. ....... 709/229 |

FOREIGN PATENT DOCUMENTS

EP 0973117 * 1/2000

OTHER PUBLICATIONS

Preslan etr al. Device Locks: Mutual Exclusion for Storage Area Network pp. 262-274, 1999.*
Mizuno et al. Lock-Based Self-Stabliizing Distributed Mutual Exclusion Algorithms, pp. 708-716, 1996.*
Cypher, The Communication Requirements of Mutual Exclusion pp. 147-156, 1995.*
Hsieh et al., Decentralized Mutual Exclusion in The Presence of Link Failures, pp. 195-203, 1989.*

* cited by examiner

*Primary Examiner*—Larry D. Donaghue

(57) ABSTRACT

A system for and method of implementing a backoff protocol and a computer network incorporating the system or the method. In one embodiment, the system includes: (1) a client subsystem that generates a request for access to a shared resource and (2) a server subsystem that receives the request, returns a LOCKED indicator upon an expectation that the shared resource is unavailable and otherwise returns a FREE indicator, the client subsystem responding to the LOCKED indicator by waiting before regenerating the request for the access.

20 Claims, 5 Drawing Sheets

```
contend():

s ← 0;

repeat [

Q₁ ← ∅;

‖_{u∈U} [ status_u ← u,try();

Q₁ ← {u} ∪ Q₁;

] until (∃Q ∈ Q:Q ⊆ Q₁);

if (|{u : status_u = LOCKED}|≤b)

return;

else s ← s + 1;

d ← _R[(Δ+4δ)]... 2ˢ(Δ+4δ);

sleep(d);

] until (false);
```

FIGURE 2A: MUTUAL EXCLUSION PROTOCOL CLIENT PROGRAM

```
try():

if (clock() - lastGranted > Δ + 2 δ)

lastGranted ← clock();

return FREE;

else return LOCKED;
```

FIGURE 2B: MUTUAL EXCLUSION PROTOCOL SERVER PROGRAM

```
1)   submit(o):
2)      waiting ← true;
3)      ∥ V₁ ← ∅; Q₁ ←_R Q;
4)         ∥_{u∈Q₁} [p_u ← u.submit(o);V₁←
            {p_u}∪ V₁;
5)         ] until (∃p:|{p_u ∈ V₁
   :p=p_u}|≥b+1;
6)         waiting ← false;
7)         return p:| {p_u ∈ V₁:p=p_u}|
            ≥b+1
8)      ∥ repeat [
9)         contend();
10)        Q₂ ← ∅;
11)        ∥_{u∈U} [⟨σ_u^c, σ_u^{pc},
      proposer_u,, pending_u⟩←u.get(r);
12)        Q₂←{u} ∪ Q₂;
13)        ] until (∃Q ∈ Q:Q ⊆ Q₂);
14)        Σ^c←{σ':|{u:σ'=σ_u^c  }|≥b+1};
15)        σ^c←:σ:σ.version=max_{σ'∈Σ^c}
            {σ'.version};
16)        σ^{pc}←choose({⟨σ_u^{pc},
      proposer_u⟩:σ  ∨≠⊥});
17)        completed←max
            {completed,max{v:|{u:σ_u^{pc}
            .version>v|≥b+1}};
18)        if σ^c≠⊥ ∧ σ^c.version>
            completed)
19)           σ←σ^c
20)        else if (σ^{pc}≠⊥ ∧ σ^{pc}.
      version > completed)
21)           σ←σ^{pc};
22)        else
23)           pending←{o:∈{u:o ∈
            pending_u}|≥b+1};
24)           σ ← apply (pending
      σ^c);
25)        Q₂ ← ∅;
26)        ∥_{u∈U} [u.propose(σ' r);Q₂←
            {u}∪Q₂;
27)        ] until (∃Q∈Q:Q⊆Q₂;

28)        Q₂ ← ∅;

29)        ∥_{u∈U} [u.commit(σ,r);Q₂ ←
            {u}∪Q₂;
30)        ] until(∃Q∈Q:Q⊆Q₂);

31)        completed ← max
      {completed,σ.version};

32)     ] until (waiting =
   false);

33) choose ({⟨σ_u^{pc},proposer_u⟩}u):
34)    S[1,2,...]←{⟨σ_u^{pc} ,
       proposer_u⟩}_u sorted in
   descending order by ⟨σ,
   proposer⟩ > ⟨σ',
   proposer'⟩⟺(σ.version >
   σ'.version ∨
   (σ.version =
   σ'.version ∧ proposer    >
   proposer'));
35)    i ← 1; count ←
   [0,0,...];
36)    repeat
          [⟨σ,proposer⟩←S[i];
37)       count[σ]←count[σ]+1;
38)       i ← i + 1;
39)    ] until(∃σ:count[σ]
          ≥b+1 ∨ i > |S|)
40)    if (∃σ:count[σ]≥b+1
41)       return σ:count
          [σ]≥b+1;
42)    else
43)       return ⊥;
44) apply (pending, σ'):
45)    repeat [ o ←_R pending;
46)       pending←pending\{o};
47)       if(σ'.reflects
          (o)=false)
48)          σ'.doOp(o);
49)    ] until (pending=∅)'
50)    σ'.version←σ'.
       version+1'
51)    return σ';
```

FIGURE 3A: CLIENT SIDE OF AN ORDERING PROTOCOL

```
1)  submit (o):
2)      pending←pending ∪{o};
3)      sleep until
        (response(o)≠⊥);
4)      return response (o);

11) propose (σ,r):
12)     if (r ≥ maxRank)
13)         maxRank ← r;
14)         proposer ← r;
15)         σ^pc ← σ;
16)         return;
17)     else
18)         throw RankException;

5)  get(r):
6)      if (r > maxRank)
7)          maxRank ← r;
8)          return ⟨◻⫯σ^c, σ^pc,
            prosper, pending⟩
9)      else
10)         throw RankException;

19) commit (σ,r):
20)     if (r ≥ maxRank)
21)         maxRank ← r;
22)         σ^c, σ;
23)         pending ← pending \
            {o:σ.reflects(o)=true};
24)         response ← response|σ.
            response;
25)         return;
26)     else
27)         throw RankException;
```

FIGURE 3B: SERVER SIDE OF AN ORDERING PROTOCOL

BACKOFF PROTOCOLS AND METHODS FOR DISTRIBUTED MUTUAL EXCLUSION AND ORDERING

CROSS-REFERENCE TO RELATED APPLICATION

The present invention is based on U.S. Provisional Patent Application Ser. No. 60/251,013, entitled "Backoff Protocols for Distributed Mutual Exclusion and Ordering," filed on Dec. 4, 2000, commonly assigned with the present invention and incorporated herein by reference.

TECHNICAL FIELD OF THE INVENTION

The present invention is directed, in general, to computer network messaging protocols and, more specifically, to backoff protocols and methods for distributed mutual exclusion and ordering.

BACKGROUND OF THE INVENTION

A mutual exclusion protocol may be generally defined a protocol in which a process can gain the right to execute for a fixed time interval without interference from other processes. Mutual exclusion may be required whenever processes need to gain access to "shared resources," such as code, data or memory in file systems and databases. However, a plurality of processes trying to gain access to a critical section of memory or code at the same time may lead to various problems, such as data corruption. Certain processes should be forced to execute a critical section or shared resource separately and serially, as opposed to concurrently. In order to achieve this goal, a mutual exclusion protocol may be required and enforced.

One mutual exclusion protocol used is a "Maekawa" type protocol. In this class of protocols, a process $p_i$ requests permission to enter the critical section from a set $Q_i$ of processes, such that $Q_i \cap Q_j \neq \emptyset$ for all i, j. Each process in a request set $Q_i$ grants exclusive access to the critical section until it is exited, and $P_i$ is allowed to enter the critical section only if all processes in $Q_i$ grant $P_i$ access. Due to the intersection property of request sets and exclusive locking at each process in a request set, only one process can be in the critical section at any time.

Due to these above properties, however, Maekawa-type algorithms are also generally prone to "deadlock" and consequently require extra messages to detect and recover from deadlocks. A "deadlock" is generally defined to occur when a process or processes become stuck, because some process has not disengaged itself from a critical section of the code for an indefinite period. Deadlock-free Maekawa-type protocols have been proposed by strengthening the constraints on request sets so that for all i, j, either $p_i \in Q_j$ or $P_j \in Q_i$. However, this strengthening may not be possible if clients (i.e. a first process) requesting mutual exclusion are distinct from servers (i.e. a second process) that comprise the request sets. Clients cannot be added to request sets because they are transient and because the population of clients that might contend is not known a priori.

One subclass of mutual exclusion protocols is what is known as a "backoff" protocol. In one embodiment of a backoff protocol, if the backoff protocol detects that a sent message somehow collides with another process, the backoff protocol "backs off" for a random delay and tries again later. Backoff protocols have been used to achieve mutual exclusion to multiple access channels, such as Ethernet. The collision detection protocol of Ethernet is a well-known example of one embodiment of a backoff protocol.

The performance of a mutual exclusion protocol, such as a backoff protocol, can generally be characterized in terms of an "amortized system response time". The amortized system response time may be generally defined as the mean delay that each of t processes incurs before entering the shared resource, the critical section, assuming that all t (and no others) start contending at the same time.

Other distributed mutual exclusion protocols can be derived from a mutual exclusion protocol for shared-memory multi-processors, by simply emulating each shared variable used in the protocol with a distributed implementation. (For more background in this area, please see "Secure and scalable replication in Phalanx" by D. Malkhi and M. K. Reiter, in *Proceedings of the 17th IEEE Symposium on Reliable Distributed Systems*, October, 1998, which is hereby incorporated by reference in its entirety). While the resulting algorithm may have superior amortized system response time (asymptotically), the performance of this protocol could be unacceptable, such as in a context of contention-free performance, perhaps due to the overhead of the variable emulation protocols. This unacceptable performance also holds for the backoff-style mutual exclusion algorithms explored above in the shared-memory setting. One such example is "The performance of spin-lock alternatives for shared-memory multiprocessors" by T. E. Anderson, in IEEE Transactions on Parallel and Distributed Systems, January 1990, (hereby incorporated by reference in its entirety) which assumes even stronger objects than shared variables.

Distributed mutual exclusion protocols in asynchronous environment have been disclosed in the context of the employment of "consensus" in the timed asynchronous model, such as disclosed in "On the possibility of consensus in asynchronous systems" by C. Fetzer and F. Cristian in *Proceedings of the 1995 Pacific Rim International Symposium on Fault-Tolerant Systems*, December, 1995, which is hereby incorporated by reference in its entirety. Consensus may be generally defined as a distributed protocol by which each process proposes a value and then decides on a value, and so that every process that does not fails decides the same value. The works of Lamport on Paxos ("The Part-time parliament" by L. Lamort, in *ACM Transactions on Computer Science*, May 1998, which is hereby incorporate by reference in its entirety), and of Keidar and Dolev who disclose an extended 3-phase commit (E3PC) protocol in "Increasing the resilience of distributed and replicated database systems" by I. Keidar and D Dolev, which is also hereby incorporated by reference in its entirety. The 3-phase commit is a well-known protocol for committing an update to a replicated database so that no two replicas commit a different update. These above works compose and disclose a mutual exclusion protocol with a "commit" protocol to derive solutions.

Paxos and E3PC, while building on mutual exclusion protocols, do not propose mutual exclusion implementations of their own. Fetzer and Cristian employ a mutual exclusion protocol that rotates the preference for access to the critical section among the possible process contenders in sequence, but enables the next preferred contender to be bypassed without delay if that contender is unavailable. In order to achieve this, however, the protocol relies on clock synchronization among the participating processes.

Therefore, what is needed in the art is an efficient mutual exclusion primitive that overcomes the deficiencies of the prior art, and by admitting arbitrary (Byzantine) server failures in the ordering protocol.

SUMMARY OF THE INVENTION

To address the above-discussed deficiencies of the prior art, the present invention provides a system for and method of implementing a backoff protocol and a computer network incorporating the system or the method. In one embodiment, the system includes: (1) a client subsystem that generates a request for access to a shared resource and (2) a server subsystem that receives the request, returns a LOCKED indicator upon an expectation that the shared resource is unavailable and otherwise returns a FREE indicator, the client subsystem responding to the LOCKED indicator by waiting before regenerating the request for the access.

The present invention therefore introduces a straightforward backoff protocol that is adaptive, probablistically alive during periods of stability and safe with respect to the risk of data loss.

In one embodiment of the present invention, the server subsystem has the expectation when the server subsystem returned the FREE indicator more than $\Delta+2\delta$ time units previously. Of course, other lengths of time are within the broad scope of the present invention.

In one embodiment of the present invention, the server subsystem is replicated among a plurality of separate servers. Alternatively, the server subsystem exists on only one server or less than the whole plurality.

In one embodiment of the present invention, the system is coupled to a synchronous computer network. Alternatively, the system operates with an asynchronous computer network.

In one embodiment of the present invention, a unique rank is associated with the request. The rank, while not necessary to the present invention, assists in the resolution of contentions for shared resources.

In one embodiment of the present invention, the shared resource is an Ethernet channel. Those skilled in the pertinent art will understand, however, that the present invention can be employed to advantage with respect to any shared resource.

In one embodiment of the present invention, the client subsystem digitally signs the request. Those skilled in the pertinent art are familiar with digital signatures and their uses. Though not required, the present invention can make advantageous use of such signatures to gain secure access to the shared resource.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 2A illustrates one embodiment of a mutual exclusion client protocol contend ( ) constructed according to the principles of the present invention;

FIG. 2B illustrates one embodiment of a mutual exclusion server protocol try ( ) constructed according to the principles of the present invention;

FIG. 3A illustrates one embodiment of a client side of an ordering protocol submit (O) constructed according to the principles of the present invention; and FIG. 3B illustrates one embodiment of a server side of an ordering protocol submit (O) constructed according to the principles of the present invention.

DETAILED DESCRIPTION

Figure 1:
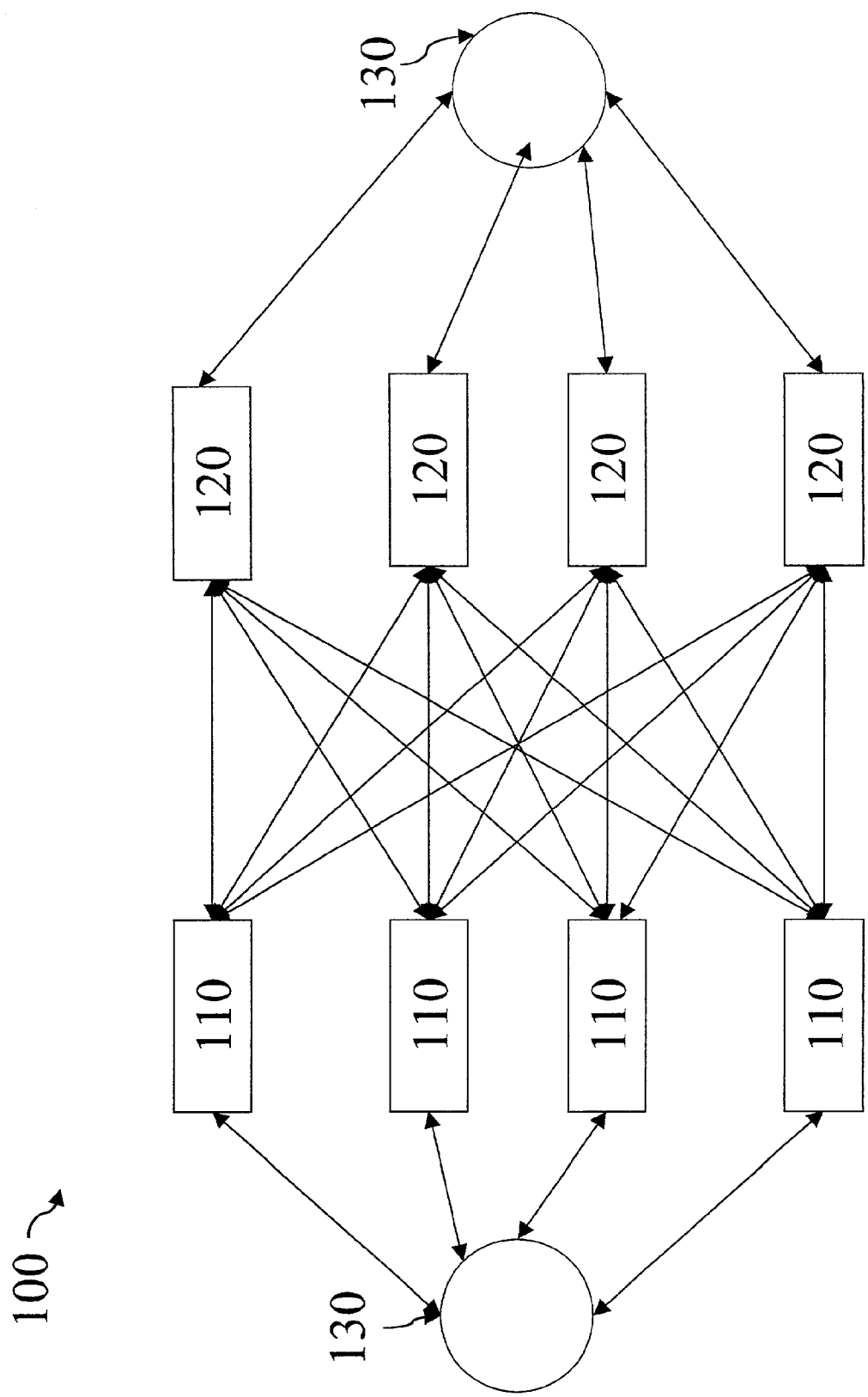
FIG. 1 illustrates an exemplary system for employing a backoff protocol for distributed mutual exclusion and ordering.

Referring initially to FIG. 1, disclosed is one embodiment of a distributed mutual exclusion and protocol ordering ("protocol") system 100 according to the principles of the present invention. The protocol system 100 employs, among other things, Maekawa's original (i.e., "weaker") intersection property: $Q_i \cap Q_j \neq \emptyset$. To reiterate, associated with the intersection property of Maekawa, a process $P_i$ requests permission to enter a critical section from a set $Q_i$ of processes, such that $Q_i \cap Q_j \neq \emptyset$ for all i, j. Each process in a request set $Q_i$ grants exclusive access to the critical section until it is exited, and $P_i$ is allowed to enter the critical section only if all processes in $Q_i$ grant $P_i$ access. Due to the intersection property of request sets and exclusive locking at each process in a request set, only one process can be in the critical section at any time.

The protocol system 100 employs a simple and efficient protocol employable for mutual exclusion in a synchronous, message-passing distributed system which may be subject to failures. Additionally, the protocol system 100 is not prone to deadlock. The protocol system 100 borrows design principles from prior work in backoff protocols for multiple access channels, such as Ethernet.

The protocol system 100 is adaptive in that the expected amortized system response time—informally, the average time a process waits before entering the critical section—is a function only of the number of client processes 110 currently contending and is independent of the maximum number of processes which might contend. In particular, in the contention-free case, a process can enter a critical section after only one round-trip message delay.

The protocol system 100 also employs protocol by which operations on a replicated object can be serially ordered. Despite the fact that this ordering protocol is deterministically safe even in an asynchronous system, and the mutual exclusion protocol of the protocol system 100 is not deterministically safe in an asynchronous system, the mutual exclusion protocol employed by the protocol system 100 helps to ensure that operations are ordered and complete (with probability one) once a given system stabilizes.

The ordering protocol employed by the protocol system 100 also may order an arbitrarily many operations on an object as soon as a single contender gains access to the critical section. Moreover, the protocol employed by the protocol system 100 has an optimization over other protocols in that the protocol system 100 need not use digital signatures or signature-like cryptographic constructions. Also, the protocol employed by the protocol system 100 may operate on quorums of servers only. As a result, the protocol system 100 should offer better performance and scalability than these prior art protocols.

The protocol to order operations on data objects in an asynchronous system in the protocol system 100 is somewhat analogous to work of Fetzer and Cristian on consensus in the timed asynchronous model, and the works of Lamport on Paxos and of Keidar and Dolev on extended 3-phase commit (E3PC).

An upper bound on the expected amortized system response time of $O(\Delta t)$ for the protocol system 100 can be proved, thereby showing that the protocol system 100 is adaptive, in that the amortized system response time is independent of the maximum number of processes that might contend. In addition, in the case of "no contention," the delay a process incurs before entering the critical section is merely one round-trip message delay on the network, and thus is independent of $\Delta$.

Fault tolerance is a feature of the protocol system 100. The protocol system 100 has distinct clients 110 and servers 120. The clients 110, which contend for mutual exclusion, may crash without affecting the protocol. In particular, since a client 110 is granted exclusion for a fixed time period $\Delta$—and there is no designated "unlock" operation that a client must perform—a failure of the client 110 after it succeeds in gaining exclusion does not preclude other clients 110 from subsequently gaining exclusion after the $\Delta$ time period expires. Moreover, the protocol system 100 masks the arbitrary (Byzantine) failure of a threshold number of servers 120.

The mutual exclusion protocol helps to ensure that operations are ordered and complete (with probability one) once the system stabilizes. The ordering protocol of the protocol system 100 orders arbitrarily many operations on the object as soon as a single contender gains access to the critical section. Moreover, also as stated above, the protocol system 100 contributes over other prior-art protocols providing similar properties in that it need not use digital signatures or signature-like cryptographic constructions and it operates on quorums of servers only. As a result, the protocol system 100 should offer better performance and scalability than these prior protocols.

Aside from always-safe operation ordering, the protocol system 100 supports highly available, shared data for clients 110 using an infrastructure of servers 120 that may suffer arbitrary (Byzantine) failures. In order to detect the presence of faulty servers 120, statistical fault detection algorithms mine for evidence of faulty servers in the responses they return, such as disclosed in "Fault detection in Byzantine quorum proceedings" by L. Alvisi et al., in *Proceedings of the 7th IFIP International Working Conference on Dependable Computing for Critical Applications*, January 1999, which is hereby incorporated by reference in its entirety. Since detection may be most accurate when access to data is gained sequentially, the protocol system 100 attempts to serialize data accesses, and the mutual exclusion protocol described herein is employed for this purpose. The mutual exclusion protocol of the protocol system 100 has the useful property that it remains probabilistically live even during periods of instability (asynchrony) in the system. So, while fault detection may suffer during periods of instability, the nonblocking properties of the protocol system's 100 data access protocols are never compromised.

The protocol system 100 divides the set of processes into clients 110 and servers 120, assuming a fixed, known set U of n of servers 120 and an arbitrary, finite, but unknown number of clients 110. The protocol of a process is described in terms of event handlers 130 that are triggered by the arrival of events such as the receipt of a message, the tick of a local clock, or input from a calling application. Once triggered, for the sake of clarity, it is assumed that the event handler 130 runs to completion without delay. In particular, neglected is the processing time of the event handler 130 itself is neglected, for the purposes of disclosing and describing the protocol system 100 (i.e. the processing times completes instantaneously).

Processes that obey their protocol specifications and receive (and handle) infinitely many events in an infinite run are called "correct." Other processes are called "faulty." Up to a threshold b of servers 120 may fail, and may do so arbitrarily (Byzantine failures); i.e., the event handlers 130 of a faulty server 120 may not conform to their specifications. While any number of clients 110 may fail, clients 110 are assumed to fail only by crashing, i.e., simply by no longer receiving events.

This restriction of client 110 failures to crashes may seem unrealistic when servers 120 are presumed to fail arbitrarily. However, in the context of the protocol system 100, the creator of a data object can prohibit untrusted clients 110 from modifying that object using access control mechanisms that remain in force provided that b or fewer servers 120 fail (even arbitrarily). Thus, the assumption of client 110 crashes in practice reduces to an assumption about the clients 110 trusted to modify that object by its creator.

For the sake of clarity, the local clock of each correct process is assumed to advance at the same rate as real time, so that a process can accurately measure the passage of a chosen, real-time timeout period. Since the timeout periods involved in the employment of the protocols of the protocol system 100 would be very short in practice, this is a reasonable assumption. It is not assumed that clocks at processes are synchronized.

Processes communicate by message passing. It is assumed that communication channels provide at-most-once message transmission: if $P_1$ and $P_2$ are correct, then $P_2$ receives any message m from $P_1$ at most once, and then only if $p_1$ sent m to $P_2$. (Obviously, it is further assumed that $p_1$ never sends the same message twice to $P_2$, which it can implement by, e.g., including a unique sequence number in the message.) There is a globally known constant $\delta$. A run is stable at real time T if for each correct client 110, there exists a quorum of correct servers 120 such that any message sent at time $T' \geq T$ between that client and a server in that quorum arrives by time $T'+\delta$. The definition of quorum that is used in the protocol system 100 will be given in the section concerning Mutual Exclusion, below.

A run is synchronous if it is stable at the time the run begins. Though processes communicate by message passing, the protocols of the protocol system 100 are presented in terms of remote operation invocations on servers 120, for simplicity of presentation.

Mutual Exclusion

In this section, presented are mutual exclusion protocols by which clients 110 can contend for the opportunity to run for $\Delta$ time units with interference by other clients 110. More precisely, there is an operation "contend" that a client can invoke. When an invocation returns at the client 110, the client 110 then has $\Delta$ time units in which to execute in isolation. After $\Delta$ time units pass, however, another client's 110 contend operation may return. One motivation behind the protocol system 100 is for clients 110 to access servers 120 simply to find out whether other clients 110 are simultaneously contending.

In order to provide mutual exclusion, every pair of clients 110 must gain access to b+1 correct servers 120 in common. If a client 110 detects that another client 110 is contending, it backs off for a random delay, chosen from a distribution that adapts to the number of contending clients 110. Intuitively, clients 110 thus delay an amount of time proportional to the number of simultaneously contending clients 110, while eventually, when they sufficiently space their contentions, each succeeds. More precisely, the protocol is probabilistically live in a synchronous system, i.e., with probability 1 some client's 110 contend operation returns.

The requirement that any two clients 110 gain access to at least b+1 common correct servers 120 can be satisfied if each client 110 queries the servers 120 according to a masking quorum system, such as disclosed in "Byzantine quorum systems" by D. Malkhi and M. K. Reiter, in *Distributed Computing*, 1998, which is hereby incorporated by reference in its entirety. A masking quorum system $Q \subseteq 2^U$ is a set of subsets of servers, called "quorums," such that for any quorums $Q_1$, $Q_2 \subseteq Q$: (i) $|Q_1 \cap Q_2| \leq 3b+1$, and (ii) $|Q_1| \leq n-b$. Property (i) ensures that if each client 110 queries a quorum of servers 120, then any two clients' 110 queries intersect in at least b+1 correct servers 120. Property (ii) ensures that some quorum is always available. Masking quorum systems are a generalization of the request sets used in Maekawa's protocol to address up to b arbitrary server 120 failures.

Turning now to FIG. 2, disclosed is a protocol employed by the protocol system 100. In FIG. 2, "∥" denotes concurrent invocation of statements, and "d $\leftarrow_R$ S" denotes the selection of an element of set S uniformly at random and assignment of that element to d. At a high level, the protocol executes as follows. When presented with a request from the client 110, the server 120 returns FREE if it last returned FREE over $\Delta+2\delta$ time ago; otherwise it returns LOCKED. To contend, a client 110 collects FREE or LOCKED responses from a quorum and succeeds if at most b responses are LOCKED.

If more than b responses are LOCKED, then it delays for some random duration in the interval $[(\Delta+4\delta) \ldots 2^s(\Delta+4\delta)]$ before trying again, where s is a "retry value" that records the number of times the client 110 has previously queried servers 120 in this contend operation. That is, the clients 110 employ an exponential backoff strategy: the expected duration of a client's 110 delay is proportional to twice its delay during its last retry.

The correctness of this protocol is proved easily in the following lemma:

Lemma 1 If the system is synchronous, and a client's contend operation returns at real time T, then no other client's contend returns in the interval $[T, T+\Delta]$.

As discussed previously, one measure of quality over which the focus of the mutual exclusion protocol is amortized system response time. The following lemma implies that the expected amortized system response time is $O(\Delta t)$.

Lemma 2 If the protocol system 100 is synchronous, t clients 110 contend, and none of these clients 110 fails, then all client's 110 contend operations return in expected $O(\Delta t)$ time.

Corollary 1 If the protocol system 110 is synchronous, then the expected amortized response time (5) with t contending clients 110 is $O(\Delta t)$.

Corollary 2 If the protocol system 100 is synchronous and some client 110 invokes contend, then with probability 1, some client's 110 content invocation returns.

In the mutual exclusion protocol as presented in FIG. 2 and analyzed in Lemma 2, client 110 backoff was exponential as a function of the number of retries in its content operation. Even though exponential backoff yields $O(\Delta t)$ amortized system response time, analysis of backoff strategies in the context of multiple access channels shows that it performs less well in other measures than various polynomial backoff strategies. While this analysis does not apply to the protocol system 100 directly, it is expected that analogous properties hold in the protocol system 100, and thus in practice it may be preferable to experiment with other backoff strategies.

Operation Ordering

One application of the protocol system 100 for the mutual exclusion protocol, such as the protocols employed in FIGS. 2A and 2B, is a protocol for serializing operations on replicas of an object in a distributed system. In order to perform an operation o on the replicated object, a client 110 application submits the operation for execution. The properties that the ordering protocol of the protocol system 100 satisfies are the following:

Order There is a well-defined sequence in which submitted operations are applied, and the result of each operation that returns is consistent with that sequence.

Liveness If a run is eventually stable, then every operation submitted by the correct client 110 is performed with probability one, and if performed, its result is returned to the client 110.

Due to the Order and Liveness properties, the protocol emulates state machine replication. For more information, please see "Implementing fault-tolerant services using the state machine approach: A tutorial" by F. B. Schneider, in *ACM Computing Surveys*, December 1990 which is hereby incorporated by reference in its entirety. However, in contrast to modern protocols for implementing state machine replication tolerant of arbitrary server 120 failures in practice, the protocol employed by the protocol system 100 has a number of advantages.

First, the protocol system 100 need not employ digital signatures or message authentication codes which limit the performance and scalability of these protocols. Second, prior approaches to state machine replication ensure that each operation is performed at all replicas; in contrast, using the protocol of the protocol system 100, each operation updates only a quorum of replicas and thus is more efficient. Third, prior protocols support only deterministic operations, since each operation is applied independently at each replica. In contrast, the protocol system 100 supports nondeterministic operations, since each operation is applied at the client 110 and the resulting object state is then copied back to servers 120.

Turning now to FIGS. 3A and 3B, disclosed are one embodiment of a detailed client process and server process, respectively. The client program for submit (O) consists of two threads executed concurrently. The first thread, described in lines 2.3–7 of FIG. 3A, simply submits the operation o to the servers for execution and awaits responses. The second thread, lines 2.8–32, invokes operations to create a new state and commits states in a serial order; this is called an "ordering thread." If f and g are functions, then f|g denotes a function such that f|g) (o)=g(o) if g(o)≠⊥ and f(o) otherwise; see line 3.23. The following subsections contain details about operations, states, and ranks that are helpful to gain a more detailed understanding of the ordering thread.

Operations and States

The protocol system 100 may apply an operation to a state to produce a new state and a return result. The client 110 submits an operation o to be performed by invoking submit (o). For simplicity of presentation, it is assumed that an operation is never submitted by two distinct clients 110 or twice by the same client 110. In practice, enforcing such uniqueness of operations can be implemented by each client 110 labeling each of its operations with the client's 110 identifier and a sequence number.

A state, denoted by a (possibly with subscripts and/or superscripts), is an abstract data type that has the following interfaces:

σ. version is an integer-valued field. It denotes the "version" of the state. This field can be set by the protocol manipulating the state.

σ. doOp(o) applies the operation o to the state σ. performing any modifications on σ. in place.

σ. response(o), if defined, is the return result for operation o.

σ. reflects (o) indicates whether σ. doOp(o) was previously executed.

A state's interfaces are assumed to satisfy the following properties. First, σ. reflects(o)=true iff σ. doOp(o) was previously invoked. In practice, this can be implemented by recording within the state the highest operation sequence number already performed for each client 110. Second, if a is the result of applying operations (via doOp) to a prior instance σ' such that σ' reflects(o)=false, σ. reflects(o) true, and σ. version=σ'. version+1, then σ. response(o) is defined and returns the result for operation o. Note that by this assumption, σ. response(o) can be eliminated ("garbage collected") when σ. version is incremented. In this way, the size of σ can be limited.

The primary data structures that grow in the protocol of the protocol system 100 as presented in FIGS. 3A and 3B are (i) the record of which client operations have been performed (to compute σ. reflects(o)) and (ii) a response function maintained at each server that records the response for each client operation (see lines 3.3–4,24). In practice, eliminating unnecessary data from these structures can be achieved, for example, by propagating information among servers 120 in the background (e.g., using the techniques of "On diffusing updates in a Byzantine environment" by D. Malkhi et al., in *Proceedings of the 18th IEEE Symposium on Reliable Distributed Systems*, October 1999, which is hereby incorporated by reference it its entirety) to convey when information about a given operation can be purged from the system. Other optimization are possible, e.g., that trade off passing complete states versus update suffixes.

Rank

Each client 110 executes the ordering thread of the protocol of the protocol system 100 with an associated integer called its "rank." It is assumed that no two clients 110 ever adopt the same rank, which can be ensured e.g., if each client's 110 rank is formed with its identifier in the low-order bits. When invoking an operation on a server 120 u in the protocol system 100, a client 110 always sends its current rank as an argument to the invocation; this rank is denoted by r in u.get(r), u.propose (σ,r)i, and u.commit (σ,r) invocations, as disclosed by FIG. 3B. A server 120 responds to only the highest-ranked client 110 that has contacted it. In particular, if a server 120 u is contacted by a client 110 with a lower rank than another client 110 to which it has already responded, then it transmits a RankException that notifies the client 110 of the higher rank under which another client 110 contacted it. In order to get the server 120 u to respond to it, the client 110 will have to abort its current protocol execution, adjust its rank, and try again (starting at line 2.8).

The precise criteria that dictate when a client 110 aborts its protocol run to adjust its rank are important to the liveness of the protocol. On the one hand, if a client 110 aborts its protocol run based upon receiving a single RankException, then the client 110 risks being aborted by a faulty server 120 who in fact was not contacted by a higher ranking client 110. On the other hand, if the client 110 required b+1 RankExceptions in order to abort, then the client 110 may not abort even though b correct servers 120 have been contacted by a higher-ranking client 110 and thus will refuse to return responses to this client 110. Due to this tradeoff, there are at least two possibilities for handling aborts in the context of the protocol system 100:

1. In one approach, clients digitally sign their ranks using a key available only to clients 110 allowed to gain access to the object (or a subset of them designated to execute the ordering protocol). When a server 120 transmits a RankException of FIG. 3B to a client 110, it passes the highest rank under which any client 110 has contracted it, including the digital signature on that rank from that client 110. The client 120 receiving the RankException can verify the validity of the rank by verifying the digital signature on it. In this implementation, a client 110 can abort its protocol run based on a single RankException with which the client 110 receives a validly signed rank, since a faulty server 120 cannot forge signatures.

2. In another approach, the definition of the quorum system is strengthened and used to ensure that for any quorum Q ∈Q, |Q|≦n−2b (rather than) |Q|≦n−b. In this way, the b correct servers 120 who do not respond to the lower-ranked client 110 are treated as "temporarily crashed" to that client 110. The fact that |Q|≦n−2b enables the client 110 to nevertheless complete its protocol run using quorums.

The first of these approaches could be implemented in the protocol system 100, but the first approach imposes overheads in terms of key management and computation. In particular, digital signatures tend to be relatively intensive to compute and verify. While for a small number of clients 110, digital signatures can be emulated using message authentication codes, this approach does not scale well. The second approach is more transparent from the perspective of implementation; quorum systems merely need to be adjusted to meet the stronger constraint.

However, whereas original masking quorum systems existed as long as n>4b, this stronger constraint limits their existence to systems in which n>6b. Despite this limitation, it is this approach which is disclosed as a preferred embodiment of the protocol system 100. When the client 110 is forced to adjust its rank due to receiving b+1 RankExceptions, it does so by choosing a value larger than the maximum of all ranks reported by those RankExceptions.

Protocol Overview

At a high level, the ordering thread of the protocol at a client 110 works by first contending for mutual exclusion, using the protocol of FIG. 2 (line 2.9). Once this contend returns, the protocol of the protocol system 100 executes similarly to a 3-phase commit protocol. It first invokes get on each server 120 u in some quorum $Q^{get}$ to obtain the states last committed to $u(\sigma_u^c)$ and last proposed to $u(\sigma_u^{pc})$; the rank proposer$_u$ of the client 110 who proposed $\sigma_u^{pc}$; and the current set pending$_u$ of pending operations submitted to server 120 u. The client 110 then computes the following values:

$\sigma^c$ is set to be the state with the highest version number that has been committed to some correct server (i.e., at least b+1 servers) in $Q^{get}$ (lines 2.14, 2.15 of FIG. 3A).

$\sigma^{pc}$ is set to be the state proposed to some correct server 120 (i.e., at least b+1 servers) in $Q^{get}$ by the highest-ranking set of proposers (lines 2.16, 33–43 of FIG. 3A). completed is set to be the highest version number of all states that the responses from the servers 120 in $Q^{get}$ reveal to be committed at a full quorum. In particular, if b+1 servers report proposed states $\sigma_u^{pc}$ with version numbers larger than v, then a state with version v must be committed at a full quorum (line 2.17 of FIG. 3A).

The client 110 chooses which state a to propose and commit to quorums based on these values. If $\sigma^c$ has a version number larger than completed, then it will propose and commit $\sigma^c$ to ensure that $\sigma^c$ gets committed to a full quorum (line 2.19). Its second choice will be to propose and commit the proposed state $\sigma^{pc}$ if its version number is larger than completed (line 2.21). Otherwise, it creates a new state by applying operations to $\sigma^c$ (lines 2.23–24, 44–51), and proposes and commits that state.

The protocol ensures that each newly proposed object state σ' is derived from the state a that has been most recently committed by applying operations in the pending sets of correct servers 120 to σ (line 2.24). This is guaranteed as follows:

If σ has been committed to a full quorum, then $\sigma^c$=σ at each correct server in that quorum. This implies that any client that succeeds in invoking get a full quorum evaluates $\sigma^c$ to σ, and applies any pending operations to it. If, on the other hand, σ has not been committed at a full quorum, then it is possible for clients 110 to evaluate $\sigma^c$ to a prior state. However, since a must be proposed to a full quorum before it is committed, any client that invokes get on a full quorum evaluates $\sigma^c$ to σ. The client 110 will therefore complete the commitment of σ (bypassing $\sigma^c$ since completed $\leq \sigma^c$ version) and then continue by applying new operations to σ to derive σ'.

Rank is used to break ties between clients 110 that attempt to propose different states simultaneously. Suppose that p and q each invoke get on a quorum of servers 120 and obtain $\sigma^c$=σ as above. If p succeeds to propose the new state σ' at some full quorum, then the protocol ensures that p's rank is higher than q's rank (otherwise, RankException would be thrown by each correct server in the intersection). Note that, even though q's rank is lower than p's, it might succeed in proposing a new state to some servers 120 (but not to a full quorum) before intersecting with p's quorum and incurring RankExceptions. Nevertheless, p's proposed state and q's proposed state must have the same version, and hence, the choose subroutine will correctly identify p's proposal as the complete one.

From the above, it is apparent that the present invention provides a system for and method of implementing a backoff protocol and a computer network incorporating the system or the method. In one embodiment, the system includes: (1) a client subsystem that generates a request for access to a shared resource and (2) a server subsystem that receives the request and returns a FREE indicator if the server returned a FREE indicator more than Δ+2δ time units previously, the server subsystem otherwise returning a LOCKED indicator, an expected duration of a delay of the access being substantially proportional to twice a previous delay.

Although the present invention has been described in detail, those skilled in the art should understand that they can make various changes, substitutions and alterations herein without departing from the spirit and scope of the invention in its broadest form.

What is claimed is:

1. A system for implementing a backoff protocol, comprising:
   a client subsystem configured to generate a request for access to a shared resource; and
   a server subsystem configured to receive said request, return a LOCKED indicator upon an expectation that said shared resource is unavailable and otherwise return a FREE indicator, said client subsystem further configured to respond to said LOCKED indicator by waiting an amount of time proportional to twice a previous amount of time associated with said waiting before regenerating said request for said access.

2. The system as recited in claim 1 wherein said server subsystem has said expectation when said server subsystem returned said FREE indicator less than Δ+2δ time units previously.

3. The system as recited in claim 1 wherein said server subsystem is replicated among a plurality of separate servers.

4. The system as recited in claim 1 wherein said system is coupled to a synchronous computer network.

5. The system as recited in claim 1 wherein a unique rank is associated with said request.

6. The system as recited in claim 1 wherein said shared resource is an Ethernet channel.

7. The system as recited in claim 1 wherein said request is independent of digital signatures.

8. The system as recited in claim 1 having an amortized system response time independent of a maximum number of possible requests for access to said shared resource.

9. A method of implementing a backoff protocol, comprising:
   generating a request to a server subsystem for access to a shared resource;
   determining if said shared resource has an expectation of being unavailable;
   returning a LOCKED indicator based upon said expectation when said shared resource is unavailable and otherwise returning a FREE indicator; and
   responding to said LOCKED indicator by waiting an amount of time proportional to twice a previous amount of time associated with said waiting before regenerating said request for said access.

10. The method as recited in claim 9 wherein said server subsystem has said expectation when said server subsystem returned said FREE indicator less than Δ+2δ time units previously.

11. The method as recited in claim 9 wherein said method is carried out in a synchronous computer network.

12. The method as recited in claim 9 wherein a unique rank is associated with said request.

13. The method as recited in claim 9 wherein said shared resource is an Ethernet channel.

14. The method as recited in claim 9 wherein said request is independent of digital signatures.

15. A computer network, comprising:
   a plurality of clients;

a plurality of servers coupled to said plurality of clients;
at least one shared resource coupled to said plurality of servers;
a system for implementing a backoff protocol with respect to said at least one shared resource, including:
   a client configured to generate a request for access to a shared resource, and
   a server configured to receive said request, return a LOCKED indicator upon an expectation that said shared resource is unavailable and otherwise return a FREE indicator, said client further configured to respond to said LOCKED indicator by waiting an amount of time proportional to twice a previous amount of time associated with said waiting before regenerating said request for said access.

16. The computer network as recited in claim 15 wherein said server subsystem has said expectation when said server subsystem returned said FREE indicator less than $\Delta+2\delta$ time units previously.

17. The computer network as recited in claim 15 wherein said computer network is synchronous.

18. The computer network as recited in claim 15 wherein a unique rank is associated with said request.

19. The computer network as recited in claim 15 wherein said one of said at least one shared resource is an Ethernet channel.

20. The computer network as recited in claim 15 wherein said request is independent of digital signatures.

* * * * *